United States Patent [19]

Hosoe et al.

[11] 4,031,383

[45] June 21, 1977

[54] METHOD FOR DETECTING VISIBILITY OF IMAGE OF AN OBJECT AND A DEVICE THEREFOR

[75] Inventors: Kazuya Hosoe; Hiroshi Aizawa, both of Machida; Seiichi Matsumoto, Yokohama; Hideo Yokota, Tokyo, all of Japan

[73] Assignee: Canon Kabushiki Kaisha, Tokyo, Japan

[22] Filed: Oct. 15, 1974

[21] Appl. No.: 515,015

[30] Foreign Application Priority Data

| Oct. 19, 1973 | Japan | 48-117552 |
| Oct. 19, 1973 | Japan | 48-117553 |
| Oct. 19, 1973 | Japan | 48-117554 |
| Oct. 19, 1973 | Japan | 48-117555 |
| Oct. 23, 1973 | Japan | 48-119280 |
| Oct. 26, 1973 | Japan | 48-120553 |
| Oct. 26, 1973 | Japan | 48-120554 |

[52] U.S. Cl. ............................ 250/201; 250/204; 352/140; 354/25; 354/31; 356/125
[51] Int. Cl.² ....................... G01J 1/20; G03B 7/08
[58] Field of Search ............... 356/4, 125, 126; 250/204, 234, 201; 353/101; 352/140; 354/25, 31

[56] References Cited

UNITED STATES PATENTS

| 3,274,913 | 9/1966 | Biedermann et al. | 354/25 |
| 3,364,815 | 1/1968 | Smith et al. | 352/140 |
| 3,469,925 | 9/1969 | Urbach et al. | 353/101 |
| 3,493,764 | 2/1970 | Craig | 356/125 |

*Primary Examiner*—Vincent P. McGraw
*Attorney, Agent, or Firm*—Toren, McGeady and Stanger

[57] ABSTRACT

The present invention relates to a method and a device for detecting visibility of the image of an object for adjusting the focus of an optical system. The invention is especially suitable to an optical instrument such as camera, using photo-electric conversion elements having non-linear resistance — intensity of illumination characteristics such as cadmium sulfide CdS or cadmium selenide CdSe, etc. The invention is characterized in that the photo-electric effect of the above mentioned photo-electric conversion elements will have mutually reverse characteristics depending on the properties inherent to the photo-electric conversion elements, to the arrangement of the electrode and the electric circuit, and further on the state of the image of an object formed on said photo-electric conversion elements. An electric circuit to enhance object image visibility is disclosed which makes use of these characteristics.

32 Claims, 27 Drawing Figures

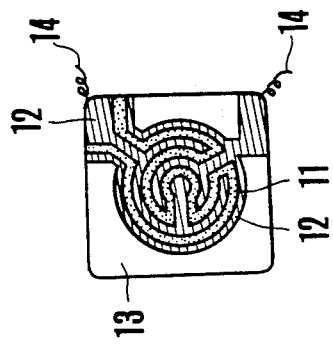
FIG.4A  FIG.4B
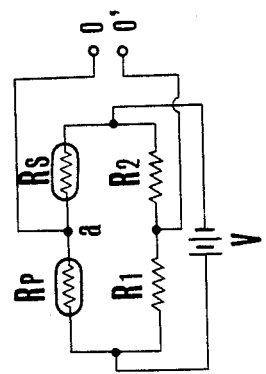
FIG.5B  FIG.5C
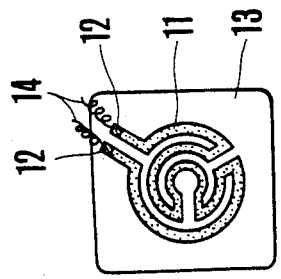
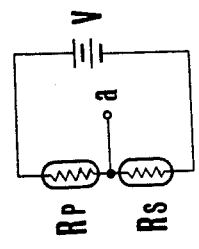
FIG.5A

FIG.6
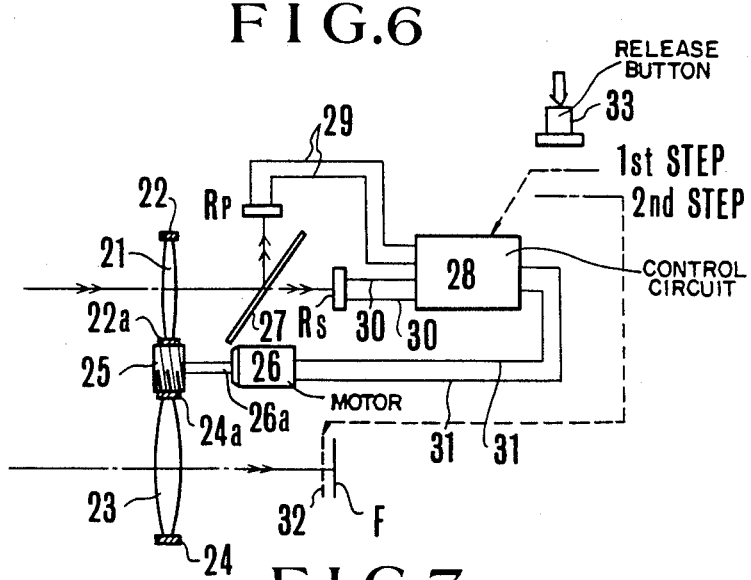
FIG.7
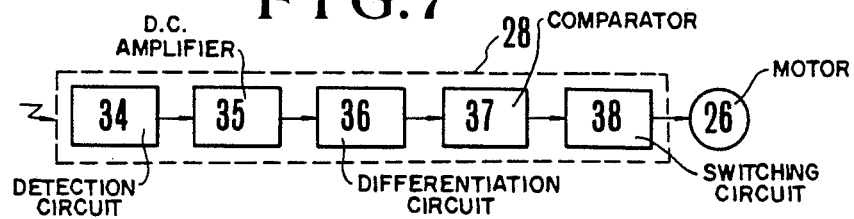
(a) FIG.8
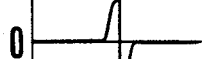
(b)
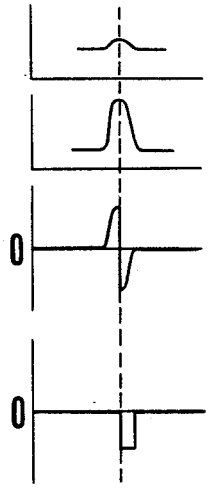
(c)
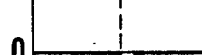
(d)

METHOD FOR DETECTING VISIBILITY OF IMAGE OF AN OBJECT AND A DEVICE THEREFOR

BACKGROUND OF THE INVENTION

1. Field of the Invention:

The present invention relates to a method and a device for detecting the visibility of object image for adjusting focus of an optical system, being especially suitable for use in such optical instrument as a camera.

2. Description of the Prior Art

Conventionally, as a method and a device for detecting visibility of object image being suitable for adjusting focus of an optical instrument such as camera, etc., Japanese Patent Publication Nos. Sho 39-29120 and Sho 41-14500 filed by the present applicant, U.S. Pat. No. 3,562,785 filed by Mr. Dwin Richardson Craig (corresponding to West German Patent DAS 1173327 Specification and Japanese Patent Publication No. Sho 44-9501) are known.

The Japanese Patent Publication No. Sho 39-29120 is a method to detect visibility of an object image by utilizing the photo-electric effect of non-linear resistance - intensity of illumination characteristics appearing clearly in such photo-electric conversion element as cadmium sulfide or cadmium selenide, etc. and forming an image on the photo-electric conversion element by an objective lens. This is done for finding out the variation in the inner resistance and the variation in the electromotive force so as to detect the visibility of an object image.

Also, Japanese Patent Publication No. Sho 41-14500 constitutes an improvement of the device of the above mentioned Japanese Patent Publication No. Sho 39-29120. It proposes a device being so made as providing two photo-electric conversion elements having such photo-conductive substances mentioned above, such as CdS, etc., at positions relatively in front of each other with the proposed focal plane of the optical system being sandwitched therebetween. Both elements are connected connecting the both to a differential circuit to detect the differential output of the both elements caused by the focus adjusting state of the optical system, thereby focusing of the optical system is detected.

Further, U.S. Pat. No. 3,562,785 utilizes basically the principle of Japanese Patent Publication No. Sho 39-29120, and proposes that when an object image is projected by an optical system on an image receiving plane of two photo-electric conversion elements having non-linear variation characteristics of the intensity of illumination versus resistance value, one of the elements receives a clear image, then the other elements is to receive diffused image, so that the variation in the resistance value of the elements, generated as a result of the variation in light distribution on the image receiving plane of said elements being caused by the variation in the sharpness of the image, is detected. Thus the optical system is adjusted until the electric response signal by both elements reaches a maximum value, and the device adjusts the optical system using the electric response signal by both elements.

The above mentioned photo-electric effect in the non-linear resistance -- intensity of illumination characteristics of photo-electric conversion element means that the electric properties of said photo-electric conversion element, especially the resistance value, increases or decreases as the visibility of object image formed on the photo-electric conversion element increases. The fact that the amount of incident light per unit area of photo-conductive substance varies depending on the variation of the visibility of object image, and as the visibility becomes maximum there will be a remarkable deflection in the distribution of the amount of incident light into each point of photo-conductive substance.

In other words, it is based on the fact that the difference in the amount of light at the bright spot and of dark spot becomes greatest when the visibility is the maximum, thereby generating great difference in the resistance value of each part of the photo-conductive substance. However, the distribution of bright spot and dark spot of an object which normally exists and is photographed is very irregular and the difference in brightness of bright spot and of dark spot, that is, the contrast, is not necessarily high. Thus sufficient photo-electric effect can not be obtained only by forming the object image on the plane of photo-electric element having a certain extension using the above mentioned photo-conductive substance, therefore the detection of visibility of object image with high degree of accuracy is difficult.

SUMMARY OF THE INVENTION

A first object of the present invention is to provide a method and a device for detecting the visibility of an object image which can obtain sufficiently the effect of the non-linear resistance -- intensity of illumination characteristics of a photo-electric conversion element and can detect with high degree of accuracy the visibility of the object image.

A second object of the present invention is to provide a method and a device for detecting visibility of object image having the function to accurately and automatically detect focus against an object with any pattern.

A third object of the present invention is to provide a method and a device for detecting visibility of an object image which can detect the state thereof when the detection of visibility of object image is difficult or impossible for some reason.

A fourth object of the present invention is to provide a method and a device which can utilize the fact that mutually reverse characteristics are generated by the effect of the non-linear resistance -- intensity of illumination characteristics of a photo-electric conversion element depending on the properties inherent in the photo-electric conversion element, the arrangement of electrode and electric circuit, and further, the state of object image formed on said photo-electric conversion element, and can detect the difference in the electric properties of the two photo-electric conversion elements, which become mutually greater by the action of the above mentioned reverse characteristics as the visibility of object image becomes better, for detecting the visibility of the object image, and at the same time, can secure remarkable enhancement in the detecting ability of the visibility of object image by providing a means to eliminate the difference in the electric properties having no relationship with the visibility of object image and being generated from the difference in the structure of each of the above mentioned photo-electric conversion elements.

A fifth object of the present invention is to provide a method and a device to detect the visibility of object image which can detect the difference in electric properties of the two photo-electric conversion elements which become mutually greater, as the visibility of object image is enhanced, by the action of the reverse characteristics which are generated mutually depending on the state of the object image formed on the photo-electric conversion element, and can sharply detect the visibility of any object image having low contrast.

A sixth object of the present invention is to provide a method and a device for detecting the visibility of an object image which utilizes the fact that reverse characteristics are mutually generated depending on the state of the object image formed on a photo-electric conversion element and detects the difference in the electric properties of two photo-electric conversion elements which becomes mutually greater by the action of said reverse characteristics as the visibility of object image improves for detecting the visibility of object image, so as to be able to detect sharply the difference in the electric properties which corresponds to the visibility of object image of the above mentioned two photo-electric conversion elements, utilizing the detection circuit for object image visibility which is achieved by connecting the above mentioned two photo-electric conversion elements to the feedback circuit and the input circuit of an arithmetic amplifier.

A seventh object of the present invention is to provide a method and a device for detecting the visibility of the object image, being suitable for adjusting focus of such optical instrument as camera.

An eighth object of the present invention is to provide a camera which can detect the visibility of object image and automatically conduct the adjustment of focus.

Further, other objects of the present invention will become apparent by the specification and the drawings to be explained below.

EXPLANATION OF THE DRAWINGS

FIG. 4 are drawings showing examples of the element of series type and of parallel type, respectively, being suitable for use in the present invention.

FIG. 6 is a schematic diagram to show the arrangement of an important part of the first concrete set up example when any one of the circuit arrangements shown in FIG. 5A to FIG. 5G is employed in a detection device for visibility of an object image being used in a camera, thus making an automatic focus adjusting system.

FIG. 7 is a block diagram to show the details of the control circuit 28 of FIG. 6.

FIG. 8 is to show chronological change in the output of each of the circuit parts 34, 35, 36 and 37 within the above mentioned control circuit 28 when the automatic focus adjusting system shown in FIG. 6 is in operation.

FIG. 17 is in operation.

DESCRIPTION OF THE PREFERRED EMBODIMENTS

Now, some examples of the method and the device for detecting visibility of an object image according to the present invention will be explained using drawings.

Figure 1A:
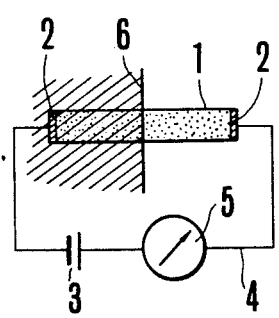
FIG. 1 is a schematic diagram showing the theoretical structure of the photo-electric conversion element suitable for use in the present invention.
Figure 1B:
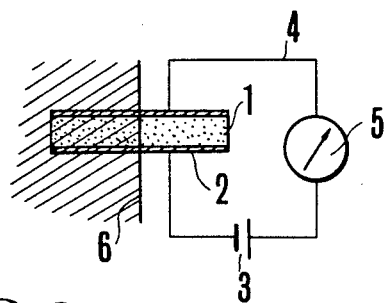

FIGS. 1A and 1B are schematic diagrams to show a theoretical structure of the photo-electric conversion element suitable for use in the present invention. FIG. 1A shows the manner in which a photo-electric conversion element formed by providing an electrode 2 at a short side of a photo-semiconductor 1 which is shaped to have an extremely shorter short side compared to its long side (hereinafter called a series type element) is connected to a power source 3 through a lead wire 4. FIG. 1B shows the manner in which a photo-electric conversion element formed by providing an electrode 2 at the long side of the photo-semiconductor 1 of similar shape (hereinafter called a parallel type element) is connected to the power source 3 through the lead wire 4. In FIGS. 1A and 1B, 5 shows an ammeter for measuring photo-current and 6 shows the boundary line between the dark portion and bright portion of the object image formed by an imaging system, not shown in the drawing, on each of the above mentioned photo-electric conversion elements.

When a photo-semiconductor is so formed that its short side is exceedingly shorter than its long side as shown above, the boundary line 6 between the bright portion and dark portion of an object image on the photo-semiconductor will come, as shown in the drawing, to have a very high frequency. In other words, it is deemed that, in a series type element (FIG. 1A), the boundary line 6 between bright and dark forms about a right angle with the direction of the photo-current while they form parallel lines in a parallel type element (FIG. 1B).

The two kinds of photo-electric conversion elements having distinctly different structure as shown in FIGS. 1A and 1B will be explained below with respect to the manner of variation in their electric properties, particularly their resistance value or photo-current caused by the change in the visibility of the object image.

Figure 2:
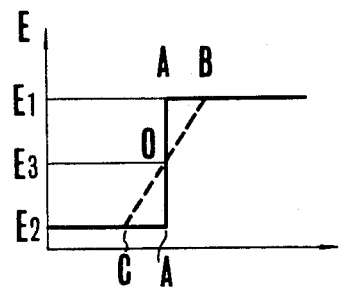
FIG. 2 is a line diagram showing an outline of the distribution of intensity of illumination of the light from an object on the photo-electric conversion element.

FIG. 2 is a line diagram to show an outline of the distribution of the light from an object on the photo-electric conversion element, wherein ordinate shows intensity of illumination while the abscissa shows the distribution zone on the photoelectric conversion element. In the drawing, a solid line shows the state of distribution of the intensity of illumination when the visibility of object image is the maximum, while the broken line shows the distribution state of the intensity of illumination when the visiblity is lowered.

Generally speaking the electric properties of a photo-semiconductor, especially the relationship between the resistance value R and the intensity of illumination E is known to satisfy the following formula:

$$R = KE^{-\gamma} \qquad (1)$$

In the above, $K$ $\gamma$ are values inherent to the photo-semiconductor in question.

Therefore, the photo-current developed when a prescribed amount of voltage is impressed an said photo-semiconductor is expressed by I in the following equation:

$$I = k'E^{\gamma} \qquad (2)$$

In the above equation, $K'$ is a constant determined by the properties inherent to the photo-semiconductor and the voltage impressed.

Figure 3A:
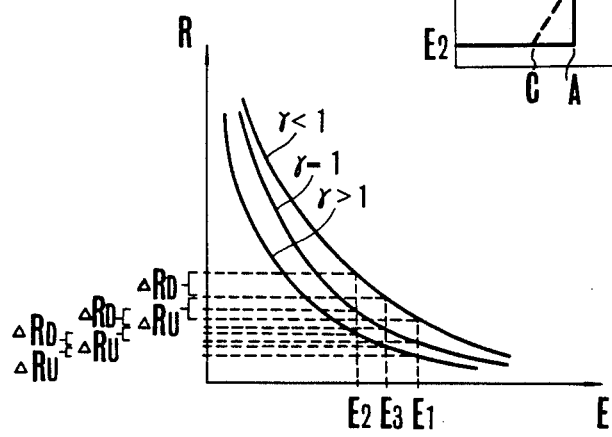
FIG. 3 is a line diagram showing relationship between the resistance value R and the intensity of illumination E and that between the photo-current I and the intensity of illumination E in the cases of $r > 1$, $r = 1$ and $r < 1$.
Figure 3B:
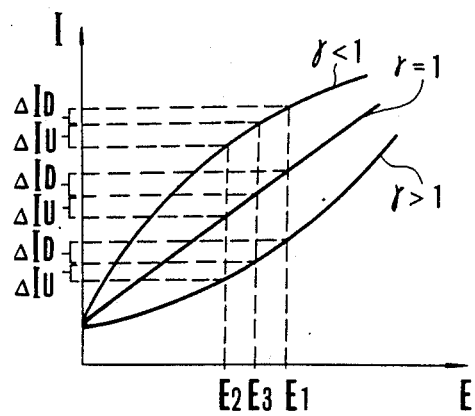

FIGS. 3A and 3B are to show the relationship between R and E, and between I and E, respectively when $\gamma > 1$, $\gamma = 1$ and $\gamma < 1$.

First, the characteristics of the series type element shown in FIG. 1A will be reviewed. Now, the distribution of intensity of illumination near the boundary line 6 between bright and dark on the light receiving plane of said element is changed as shown generally in FIG. 2 from the solid line A—A to broken line B—C. That is, the intensity of illumination is lowered at the AB part close to the right hand side of the point A, while the intensity of illumination is increased the at AC part close to the left hand side of the point A. There, the intensity of illumination $E_3$ may be regarded as the mean value of $E_1$ and $E_2$.

In FIG. 3A, the relationship between said variation in the intensity of illumination and the variation in the local resistance value is reviewed. If, the length of the AB part and of the AC part is very small, the above mentioned lowering of intensity of illumination may be regarded as corresponding to the variation of intensity of illumination from $E_1$ to $E_2$, while the increase of intensity of illumination may be regarded as corresponding to the variation in the intensity of illumination from $E_2$ to $E_3$. Therefore, as shown in FIG. 3A, in the case of $\gamma < 1$, the increase of the resistance value accompanying with the variation in the intensity of illumination becomes $\Delta R_U$, while the decrease of resistance value becomes $\Delta R_D$. On the other hand, when the formula (1) is differentiated twice, it becomes as shown in the following formula:

$$(d^2R/dE^2) = K \gamma(\gamma +1)E^{-(\gamma + 2)} > 0$$

As is apparent from the above the relationship between $\Delta R_D$ and $\Delta R_U$ will become $\Delta R_D > \Delta R_U$. Therefore, the algebraic sum of the variation in the resistance value by local change in the intensity of illumination will become negative. Thus, the total resistance value of the photo-semiconductor 1 decreases and photo-current increases. This will be also true apparently in the case of $\gamma = 1$, $\gamma > 1$. In other words, it reveals that in the case of the series type element, the resistance value thereof will become the maximum (the photo-current value becomes the minimum) when the visibility of the object image is the maximum.

Next, a similar review will be made of the characteristics of a parallel type element. But in this case, to facilitate the review, it will be considered in regard to the relationship between I and E of FIG. 3B. When the decrease of photo-current accompanied by the decrease of intensity of illumination at AB part is expressed as $\Delta I_D$, and the increase in photo-current accompanied by the increase in the intensity of illumination at AC part is expressed $\Delta I_U$, the following equation is derived from the formula (2):

$$(d^2I/dE^2) = K'\gamma (\gamma - 1) E^{\gamma - 2}$$

and depending on $\gamma < 1$, $\gamma = 1$, $\gamma > 1$, the following relationship is derived:

$$(d^2I/dE^2) < 0, (d^2I/dE^2) = 0, (d^2I/dE^2) > 0$$

Therefore, in the case of $\gamma < 1$, $\Delta I_U > \Delta I_D$ is obtained, and in the case of $\gamma = 1$, $\Delta I_U = \Delta I_D$ is obtained, while in the case of $\gamma > 1$, $\Delta I_U < \Delta I_D$ is obtained. Therefore, it is revealed that in the case of $\gamma < 1$, the photo-current flowing entire photo-semiconductor 1 becomes the minimum (the resistance value becomes the maximum) when the visibility of object image is the maximum, and in the case of $\gamma = 1$, the photo-current will be constant (the resistance value becomes constant) regardless of local change in the visibility of object image, while in the case of $\gamma > 1$, the photo-current becomes the maximum (the resistance value becomes the minimum) when the visibility of object image is the maximum.

As a result of above review, it becomes apparent that while a series type element and such parallel type element as $\gamma > 1$ both have such non-linear photo-electric effect of photo-semiconductor, their electric properties especially the manner of variation in their resistance value accompanied by the variation in the visibility of object image will be reverse to each other. Therefore, for example, when the same object image is formed on a series type and parallel type elements which are made of a photo-semiconductor as $\gamma > 1$, having the visibility of said object image on each element increases, the resistance value increases in a series type element, while the resistance value decreases on a parallel type element, the difference in the resistance value of both photo-electric conversion elements becomes remarkably large, thus the detection ability largely enhances compared to the case when the detection of visibility of object image is made using only one type of element.

The present invention is, in short, aimed at conducting sharp detection of visibility of object image by using both the series type element and the parallel type element having mutually reverse characteristics and by multiplying the detection effect based on said characteristics.

Figure 14:
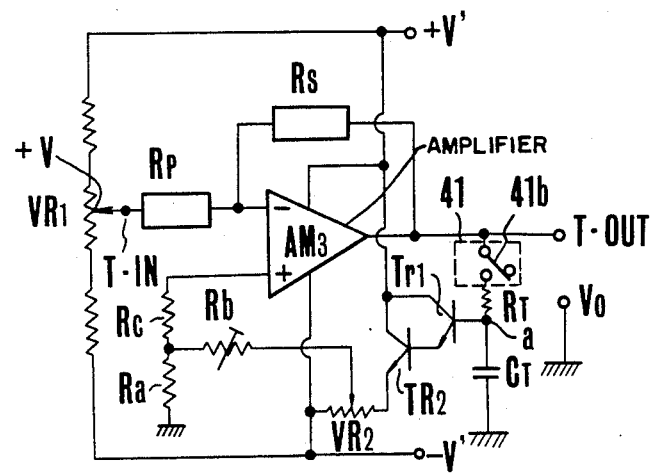
FIG. 14 is an electric connection diagram to show details of the detection circuit for visibility an object image applied to the example shown in FIG. 13.

FIG. 4A and FIG. 4B are drawings to show an example of the above mentioned series type element and the parallel type element, respectively, being suitable for use in the present invention. The series type element has an electrode 12 formed along the short side of a photo-semiconductor 11 of the shape as forming an arc, as shown in FIG. 4A, and these elements are formed as being provided on a non-conductive substrate 13. Also the parallel type element has, as shown in FIG. 4B, an electrode 12 being formed along with the long side of the photo-semiconductor 11 having same shape as that of the above mentioned series type element, and these elements are formed as being provided on a non-conductive substrate 13. In FIG. 4A and FIG. 4B, 14 is a lead wire for connection being connected to the above mentioned electrode 12.

The shape of the photo-semiconductor 11 shown in FIG. 4A and FIG. 4B is largely different from the shape of the photo-semiconductor 1 in FIG. 1A and FIG. 1B, and in view of the fact that basic arrangement of the element is the same and an image of general object has a complicated shape containing a boundary line between bright and dark in various directions in those shown in FIG. 4A and FIG. 4B, they are made into such shape as forming an arc so that the above mentioned function can be fully attained for the image of said object, thus the shape of the photo-semiconductor is not necessarily limited to those shown in FIG. 4A and FIG. 4B.

Next, explanations will be made concerning a concrete example of the detection circuit for improved visibility of object image by combination of each type of photo-electric conversion elements mentioned above referring to FIG. 5A to FIG. 5G. In FIG. 5A to FIG. 5G, $R_s$, $R_p$ show the above mentioned series type element and parallel type element, respectively.

FIG. 5A is to show the case when $R_s$ and $R_p$ are connected in series and voltage is impressed by a power source V, and the electric potential of the connecting point a of $R_s$ and $R_p$ varies following the change of the resistance value of $R_s$, $R_p$. If $R_p$ has $\gamma > 1$, as the visibility of the image of same object on each element is enhanced, the resistance value of $R_s$ increases and the resistance value of $R_p$ decreases contrarily, therefore the electric potential of the point a increases and as the visibility of the image on each element becomes the maximum, the electric potential of the point a reaches to the maximum value.

FIG. 5B shows the case when the series circuit of $R_p$ and $R_s$ and the series circuit of the resistance $R_1$ and the variable resistance $R_2$ are connected in parallel with the power source V to form a bridge circuit, wherein when $R_p$ is $\gamma > 1$, as the visibility of the image on $R_s$, $R_p$ increases, the resistance value of $R_s$ increases, on the other hand the resistance value of $R_p$ decreases. Therefore the electric potential of the connecting point a between $R_s$ and $R_p$ increases, thus the voltage generated between the output terminals O, O' becomes the maximum when the visibility of the image becomes the maximum.

FIG. 5C shows the case when the series circuit of $R_s$ and the resistance $R_1$ and the series circuit of $R_p$ and the variable resistance $R_2$ are connected in parallel with the power source V to form a bridge circuit. In this case, when $R_p$ is $\gamma > 1$, the electric potential at the connecting point a of $R_s$ and $R_1$ shows the maximum as the visibility of the image on each element $R_s$, $R_p$ becomes the maximum, while the electric potential at the connecting point b of $R_p$ and $R_2$ shows the minimum, thus the voltage generated between the output terminals O, O' of the bridge circuit becomes maximum.

Also, when the $\gamma$ of $R_p$ is made almost equal to 1 in the circuit arrangement shown in FIG. 5C, said $R_p$ will not depend on the visibility of the object image, instead will have variation a in its resistance value depending on only the brightness of the object, therefore while the electric potential of the point a goes up as the visibility of object image goes up, the electric potential of the point b will not vary but instead will take such value as corresponding to the brightness of object, and the potential difference between the terminals O, O' will also become maximum at such point that the visibility of object image becomes maximum. Therefore the variation in the level between the terminals O, O' due to the brightness of object is to be held down.

Figure 5D:
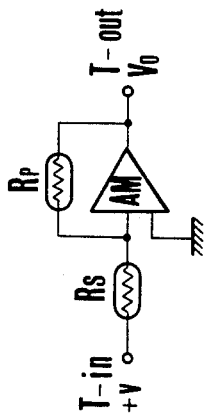
FIG. 5 show examples of different detective circuits for visibility of object image.

FIG. 5D shows such state that a bridge circuit, being composed by connecting $R_s$ and such $R_p$ as $\gamma < 1$ to the two sides on one of the diagonal lines and connecting the resistance $R_1$ and the variable resistance $R_2$ to the two sides on the other diagonal lines, has voltage being impressed thereon by the power source V. In this case, when the visibility of object on $R_s$, $R_p$ increases, both $R_s$, $R_p$ will have their resistance values increased, thus the electric potential of the connecting point a of $R_s$ and $R_2$ increases while the electric potential of the connecting point b of $R_p$ and $R_1$ lowers, therefore, the potential difference between output terminals O, O' of the bridge circuit increases, and when the visibility of object image becomes the maximum this potential difference becomes the maximum. Also, such parallel type element $R_p$ as $\gamma > 1$ may be replaced by such series type element $R_s$ as having similar characteristics.

Figure 5E:
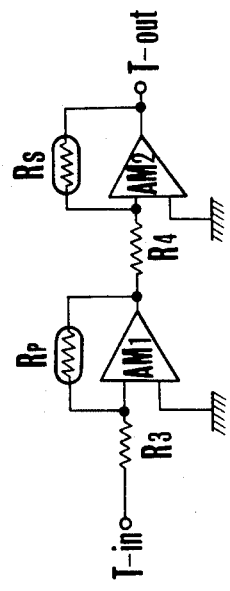

FIG. 5E shows such arrangement as connecting the element $R_s$ to the input circuit of an arithmetic amplifier AM and connecting the element $R_p$ to the feedback circuit of said amplifier, wherein when the input $+V$ is given to the input terminal T-in of said amplifier AM, the output $V_o$ appearing at its output terminal T-out is expressed by:

$$V_o = -(R_p/R_s)V$$

Therefore, if $R_p$ is $\gamma > 1$, as the visibility of object image on each element goes up, the resistance value of $R_s$ becomes large, on the other hand the resistance value of $R_p$ becomes small. Therefore, $R_p/R_s$ becomes small. That is, the gain of the arithmetic amplifier AM comes down and the output $V_o$ becomes small. By this, as the visibility of object image becomes maximum, the output $V_o$ becomes minimum and the visibility of object image can be detected.

Figure 5F:
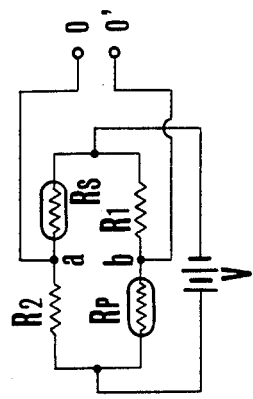

FIG. 5F shows such arrangement as connecting the element $R_p$ to the input circuit of the arithmetic amplifier AM and connecting the element $R_s$ to the feedback circuit of said amplifier AM, being reverse to that of FIG. 5E, wherein the output $V_o$ corresponding to the input $+V$ in this case is expressed by:

$$V_o = (R_s/R_p)V$$

Therefore, it is apparent that if $R_p$ is $\gamma > 1$, as the visibility of image on each element increases, $R_s/R_p$ becomes large thus such result as being reverse to the case of the circuit arrangement of FIG. 5E is obtained.

Figure 5G:
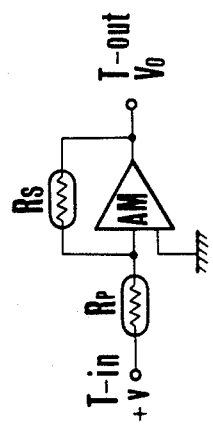

FIG. 5G shows circuit arrangement in which the two arithmetic amplifiers $AM_1$, $AM_2$ are cascade connected, wherein the elements $R_p$, $R_s$ are connected to the feedback circuit of each of the amplifier, and the resistances $R_3$, $R_4$ are connected to the input circuit of each of the same. In this case the electric potential of the output terminal T-out varies corresponding to the ratio of $R_p \times R_s$ and $R_3 \times R_4$. Therefore when such $R_p$ as $\gamma < 1$ is used, both $R_p$, $R_s$ have their resistance values increased as the visibility of object image increases, therefore the electric potential of the output terminal T-out goes up and reaches the maximum as the visibility of image becomes maximum.

FIG. 6 is to show important part of first concrete arrangement example when a visibility of object image detection device employing any one of the circuit arrangements shown in FIG. 5A to FIG. 5G is fitted to a camera to make an automatic forcus adjusting device system. In the drawing, 21 is an optical system for detecting visibility of image, 22 is a body tube to hold said optical system, 23 is a photographing optical system, 24 is a body tube to hold said photographing optical system, and the body tubes 22, 24 have racks 22a, 24a, respectively formed at their parts. 25 is a worm gear attached to an axle 26a of a motor 26, and said worm gear 25 engages with both of the rackes 22a, 24a of the above mentioned body tubes 22, 24. Therefore, the above mentioned optical system 21 for detecting object visibility and the photographing optical system 23 move to same direction simultaneously and equally by the rotation of the motor 26.

27 is a semi-transparent mirror provided obliquely behind the above mentioned optical system 21, and luminous flux being incident through the optical system 21 is adequately divided into two by the same. $R_p$, $R_s$ are the above mentioned parallel type element and the series type element, and they are provided at the focal plane of the optical system 21 for image visibility detection and equivalent position or near them, respectively to receive the luminous flux being divided into two by the above mentioned semi-transparent mirror 27. Therefore, the image of the same object is to be formed on the above mentioned elements $R_p$, $R_s$.

The transmittivity of the above mentioned obliquely provided semi-transparent mirror 27 is preferably so determined as obtaining such luminous flux dividing ratio as making almost equal the electric properties of the both elements $R_p$, $R_s$ when the object image is formed corresponding, for example, to the difference of the electric properties in dark and bright of both elements or to the similar difference under uniform intensity of illumination. 28 is a control circuit containing an object image visibility detecting circuit (the typical example thereof is shown in FIG. 5A to FIG. 5G), and the above mentioned elements $R_p$, $R_s$ and the motor 26 are connected to said control circuit 28 through connecting lines 29, 30, 31, respectively. F shows film positioned at focal plane of the photographing optical system 23. 32 shows an opening and closing member for a shutter placed in front of said film, and 33 shows a release button of a camera in a general manner.

The set-up of the above mentioned control circuit is as shown in the block diagram in FIG. 7. That is, the control circuit 28 (shown by broken line in FIG. 7) has a detection circuit 34 for object image visibility using a suitable example of the circuit arrangements shown in FIG. 5A to FIG. 5G, and a direct current amplifier 35, a differentiation circuit 36, a comparator 37 and a switching circuit 38 and the above mentioned motor 26 is connected to the output terminal of said switching circuit 38.

(a), (b), (c), (d) of FIG. 8 are to show the chronological change of each of the output of the circuit parts 34, 35, 36 and 37, respectively, within the above mentioned control circuit 28 when the automatic focus adjusting system with above arrangement is in operation.

Next, the operation of this system will be explained. When the system is pointed to an object to be photographed by a photographer, and a release button 33 of 2 step operation is pressed down to a first step, the control circuit 28 is placed in an operative state and the motor 26 is rotated to a prescribed direction to shift the photographing optical system 23 and the visibility detection optical system 21 from near position or infinity position to a certain direction. The chronological change of the output of each circuit block, 34, 35, 36, 37 of the control circuit 28 at this time is shown in (a) to (d) of FIG. 8.

The output of the image visibility detection circuit 34 will vary as shown in FIG. 8(a). That is, the output makes sudden increase and decrease with the maximum visibility point of object image as the boundary. The variation of output of the direct current amplifier 35 is shown in FIG. 8(b) and is only that the output of the circuit 34 is simply amplified. The output variation of the differentiation circuit 36 is shown in FIG. 8(c), and the code is reversed infront and at the rear of the maximum visibility point of object image, thus it so varies as passing the zero electric potential within a very short period of time at the maximum visibility point. The reference electric potential of the comparator 37 is set at zero in this example and at the moment the output of the differentiation circuit 36 passes the zero potential, that is, at the moment the visibility of image of same object on the elements $R_s$, $R_p$ formed by the optical system 21 becomes maximum (of course, at this time the visibility of object image on the film F formed by the photographing optical system 23 also becomes the maximum), such pulse as shown in FIG. 8(a) is generated. The pulse shown in FIG. 8(a) is supplied to the switching circuit 38 and the motor 26 is placed in short-circuited state instantly and is suddenly stopped. Therefore the photographer learns from the above that the optical systems 21, 23 are stopped by some means and the object image on the film F is most distinctly imaged, then by pressing the release button 33 down to the second step, the shutter opening and closing member 32 is opened and closed as conventionally known to give proper exposure to the film F, thus completing photographing.

Figure 9:
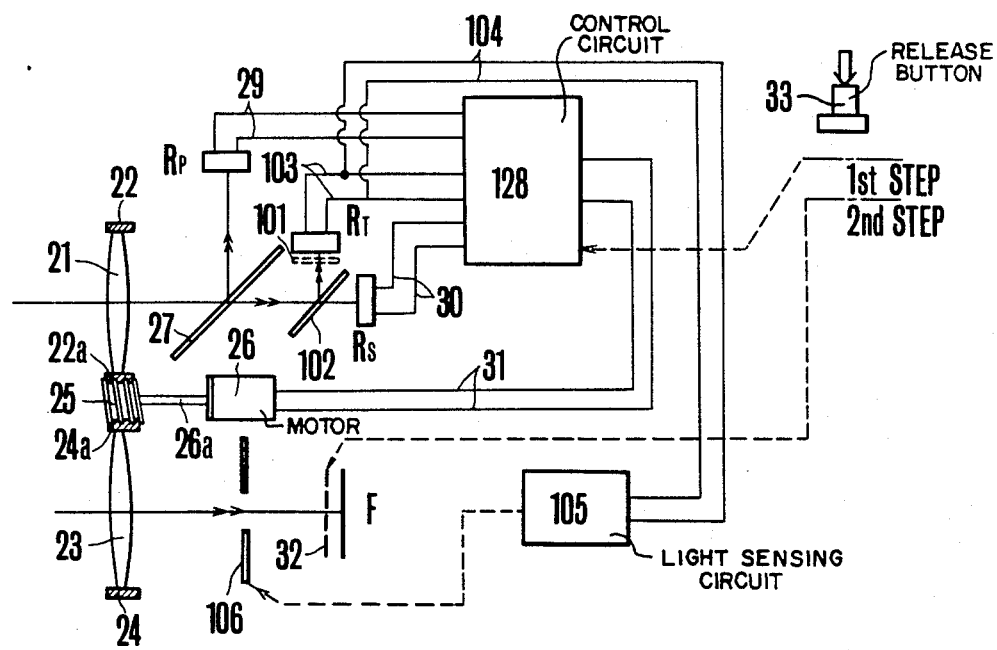
FIG. 9 is a schematic diagram to show the arrangement of an important part of a second example when an automatic focus adjusting system of a camera is composed using the detection method for visibility of object image according to the present invention.
Figure 10:
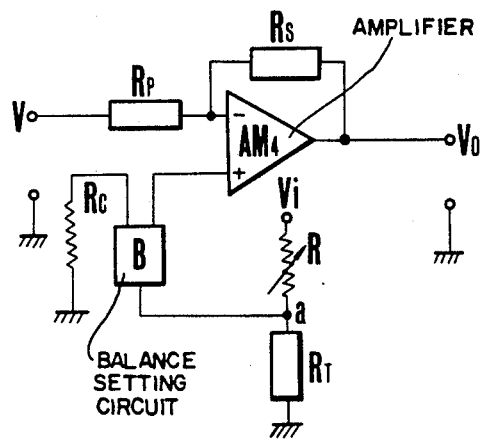
FIG. 10 is a circuit diagram to concretely show the detection circuit for visibility of object image applied to the example shown in FIG. 9.

FIG. 9 shows arrangement of an important part of second concrete example when an automatic focus adjusting system of a camera is made using the detecting method of object image visibility according to the present invention. While the system of this example can employ any one of the circuit arrangements shown in FIG. 5A to FIG. 5G as the detection circuit of object image visibility thereof, here such circuit as shown in FIG. 10 being composed based on the circuit of FIG. 5F is employed particularly.

In FIG. 9, as the arrangement and function of the elements shown by the same codes as the component elements of the system shown in FIG. 6 will be the same as in the case of the system of FIG. 6, explanation of the same may very well be omitted without precluding understanding.

The improvement provided in the system of this example exists in that the mean intensity of illumination of object image is detected so that the noise output of the image visibility detection circuit may be eliminated by utilizing the output at this time.

In FIG. 9, a second semi-transparent mirror 102 for projecting luminous flux onto a third photo-electric conversion element $R_T$ provided to detect the mean intensity of illumination of the object image is also provided behind the semi-transparent mirror 27 provided to adequately divide luminous flux of object to the elements $R_s$, $R_p$. It is also possible to provide a luminous flux diffusing plate 101 as required in front of the above mentioned third photo-electric conversion element $R_T$ to diffuse incident luminous flux. The element $R_T$ is connected to the control circuit 128 through a connecting line 103. The series type element $R_s$ and the parallel type element $R_p$ are, as shown in FIG. 10, connected to the feedback circuit and the input circuit, respectively, of the arithmetic amplifier $AM_4$. Voltage V is impressed to the ($-$) input side of the arithmetic amplifier $AM_4$ and the resistance $R_c$ for compensating drift is connected to the ($+$) input side through the balance setting circuit B to be described later. As known well, the output $V_o$ of this kind of circuit is given by the following equation:

$$V_o = - (R_s/R_p) V$$

That is, $R_s/R_p$ gives the gain of the above mentioned amplifier. Therefore, the variation in the electric properties of $R_s$, $R_p$ especially the resistance value accompanied by the variation in the object image visibility becomes the variation in the gain, and the output $V_o$ is to be determined depending on the object image visibility. Especially, if the $\gamma$ of the parallel type element $R_p$ is $\gamma > 1$, the $R_s$ takes the maximum value when the object image visibility is the maximum, and at the same time $R_p$ takes the minimum value, therefore $R_s/R_p$ that is the gain becomes the maximum, and the most distinct point of object image is detected by treating the output $V_o$ by the electric circuit to be described below, thereby the above mentioned photographing optical system 23 may be so controlled that the object image formed on the film plane F becomes most distinctive.

The image visibility detection circuit shown in FIG. 10 can sharply detect the visibility of any given object, that is, since the set-up of the series type element and that of the parallel type element are remarkably different as shown in FIG. 1A, FIG. 1B or in FIG. 4A, FIG. 4B, even if each element is irradiated with the same intensity of illumination, great difference can not be avoided in the electric properties thereof, especially its resistance value. Therefore, it is not only apparent that said difference in the properties value not being derived from the object image visibility affect adversely the detecting function of the detection circuit of FIG. 10 as noise, but the above mentioned difference may vary depending on the various brightness of an object. For example, when there is difference in the $\gamma$ value, K value (shown in the formula (1)) of each element, such tendency is remarkable, and the difference in $\gamma$ value and K value of each element is generated inevitably in the production of the elements.

In the system of this example, said disadvantage is eliminated using the auxiliary circuit to be described below, in view of the above. In FIG. 10, the above mentioned third photo-electric conversion element $R_T$ is connected in series to the variable resistance R, and voltage Vi is supplied to both ends of them. The output of the connecting point a of $R_T$ and R is supplied to the balance setting circuit B, and the output of this balance setting circuit is supplied to the input side of the amplification amplifier $AM_4$ as offset voltage (or current), thus the connections are so made as eliminating the noise output as mentioned above.

In such detection circuit for object visibility as mentioned above, since the third photo-electric conversion element $R_T$ can detect the brightness of object image only as mentioned above, the electric properties of $R_T$, especially its resistance value vary depending on the intensity of illumination of object image, thus the input into the balance setting circuit B varies following the same. As the balance setting circuit B is so composed as varying the offset voltage of the arithmetic amplifier $AM_4$ by the variation of the input thereinto in such manner as eliminating the above mentioned noise output, the variation of the output $V_o$ will be always generated in correspondence to the object image visibility.

In FIG. 9, 105 is a light sensing circuit being connected to the above mentioned third photo-electric conversion element $R_T$ through the connecting wire 104, and is a light sensing circuit to effect exposure control by detecting the output of the element $R_T$ and controlling a diaphragm 106 provided within the optical path of the photographing system 23 according to the value of the output sensed as above, that is, according to the object brightness. The electric output of the above mentioned third photo-electric conversion element $R_T$ can be utilized not only for such light sensing is mentioned above but also as the time constant setting means of a so-called and conventionally known electronic shutter time measuring circuit. Further, it is naturally possible to use the electric output of one of the series type element and the parallel type element as such control signal as mentioned above.

The arrangement of the control circuit 128 is shown in FIG. 7, being the same as in the system example mentioned above, wherein the chronological variation in the output of each circuit part at the time of operation of the system is similarly shown in FIG. 8. But, as the image visibility detection circuit 34, such circuit as shown in FIG. 10 is used as mentioned above.

Also the function of the system of this example is the same as the function of the system example shown in FIG. 7, However, in the system of this example not only the automatic focus adjustment of the photographing optical system 23 but the automatic control of an diaphragm can be done in photographing.

Figure 11:
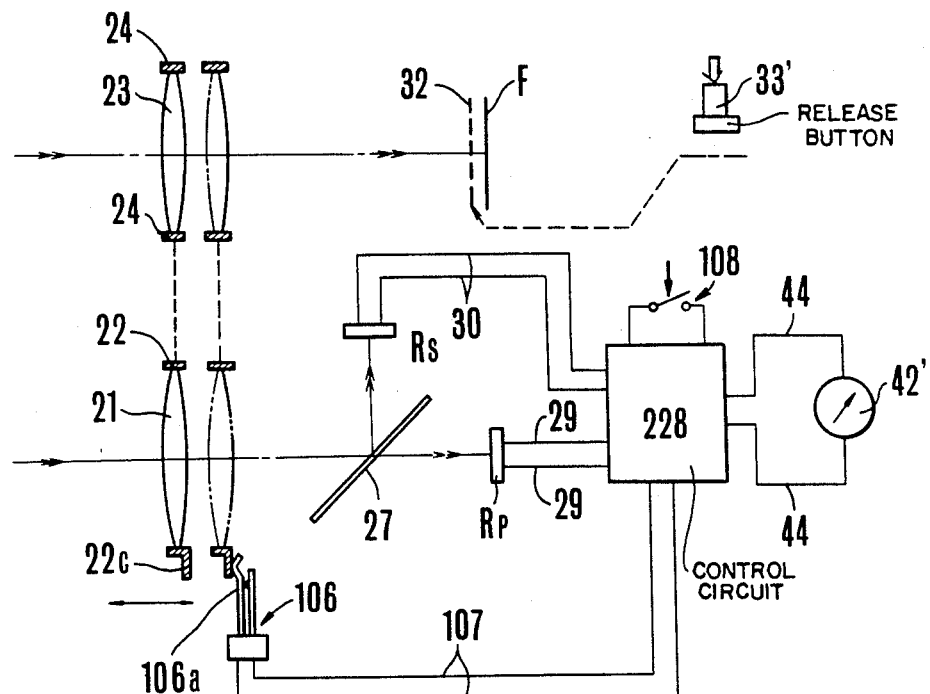
FIG. 11 is a schematic diagram to show arrangement of important parts of one concrete example when a focussing detection system of a camera is composed using the method of detecting visibility of object image according to the present invention.

FIG. 11 is to show the arrangement of an important part of one concrete example in the case when a focusing detection system of a camera is composed using the detection method of object image brightness according to the present invention. Also FIG. 12 shows the arrangement of the image visibility detection system employed in this system.

In FIG. 11, the arrangement of component elements shown by the same code as in the component elements of the system shown in FIG. 9 and their function are same as in the two preceeding cases, therefore the explanations thereof will be omitted as much as possible to avoid complications by repeated explanations.

Figure 12:
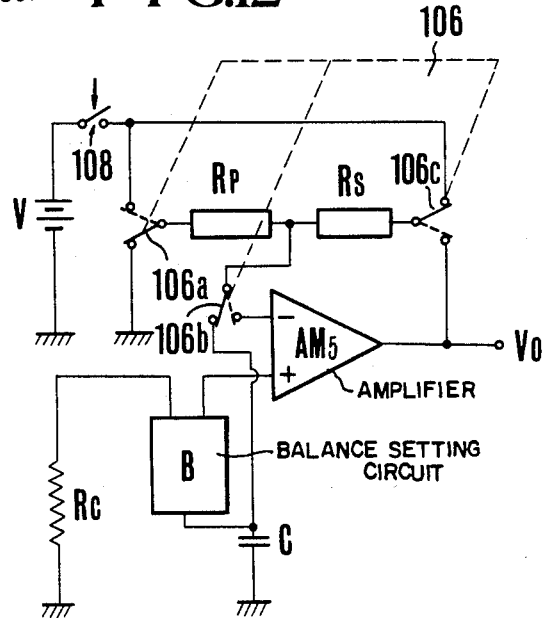
FIG. 12 is a drawing to show arrangement of the detection circuit of visibility of object image used in the system shown in FIG. 11.

In the system of this example, the optical systems 21, 23 are so composed as being proceeded and retreated integrally and along the optical axis (in the manner shown by an arrow mark in the drawing). 106 is a triple switch having three movable contacting pieces 106a, 106b, 106c as shown in FIG. 12, and is positioned at such position that the above mentioned three movable contacting pieces 106a, 106b, 106c can be simultaneously changed over by a bent piece 22c of the body tube 22 when the optical systems 21, 23 are shifted to an over focal distance position shown by two dot chain line in FIG. 11, and is connected to the control circuit 228 through the connecting wire 107. 42' is an indication meter which is connected to the final output step of the control circuit 228 through the connecting wire 44 to indicate the state of variation of visibility of object image accompanying to the shifting of the optical system. 108 is a power source switch for initiating the operation of the system, and is closed manually at the time of initiation of operation.

In using this system, a photographer first sets the optical systems 21, 23 at an over focal distance position shown by two dot chain line in FIG. 11. By this the movable contacting pieces 106a, 106b, 106c of the switch 106 are set in a state shown by solid line in FIG. 12, thus the elements $R_s$, $R_p$ are connected in series and a capacitor C will be connected to the connecting point C of said elements. As the power source switch 108 is closed voltage V is impressed to both terminals of the series circuit of the elements, $R_s$, $R_p$, and since a very obscure image of an object is formed on a light receiving plane of said elements, such output as corresponding only to the brightness of an object will be generated. The potential of the connecting point b of the elements, $R_s$, $R_p$ will naturally vary corresponding to the difference of electric properties of the both elements, and said potential is provided in the capacitor C and is retained for a certain length of time. The potential of said capacitor C is supplied to the balance setting circuit B. The balance setting circuit B is connected to the input of the arithmetic amplifier $AM_s$, further, depending on said input, that is, on the difference of electric properties corresponding to the brightness of the object of the elements, $R_s$, $R_p$, such offset voltage (or current) as being so controlled as eliminating the above mentioned noise output is given. $R_c$ is a resistance for compensating drift. Therefore, from the above while the optical systems 21, 23 are retained at a prescribed position, that is, at an over focal distance position, the offset voltage (or current) of the arithmetic amplifier $AM_s$ used for visibility detection of the image is so set as being able to eliminate noise output not being derived from the image visibility depending on the object condition. After that, as the optical systems 21, 23 are shifted from their over focal distance position, the movable contacting pieces 106a, 106b, 106c of the triple switch 106 are set in such state as shown by broken line in FIG. 12, thus the elements $R_s$, $R_p$ are connected to the input circuit and the feedback circuit, respectively, of the arithmetic amplifier $AM_s$, therefore, these elements are to detect the maximum visibility point of object image being accompanied by the shifting of the optical systems 21, 23 in same manner as in the above mentioned system example. The output $V_o$ at this time will be purely corresponding to the visibility of object image by the adjusting effect of the above mentioned offset voltage (or current). Therefore, when a photographer detects the maximum visibility point of image by the indication meter 42' in adjusting the optical systems, 21, 23, he can properly focus the photographing optical system 23. And if the release button 33' is pressed down in this state, the shutter opening and closing member 32 is opened or closed to give exposure to the film F.

Figure 13:
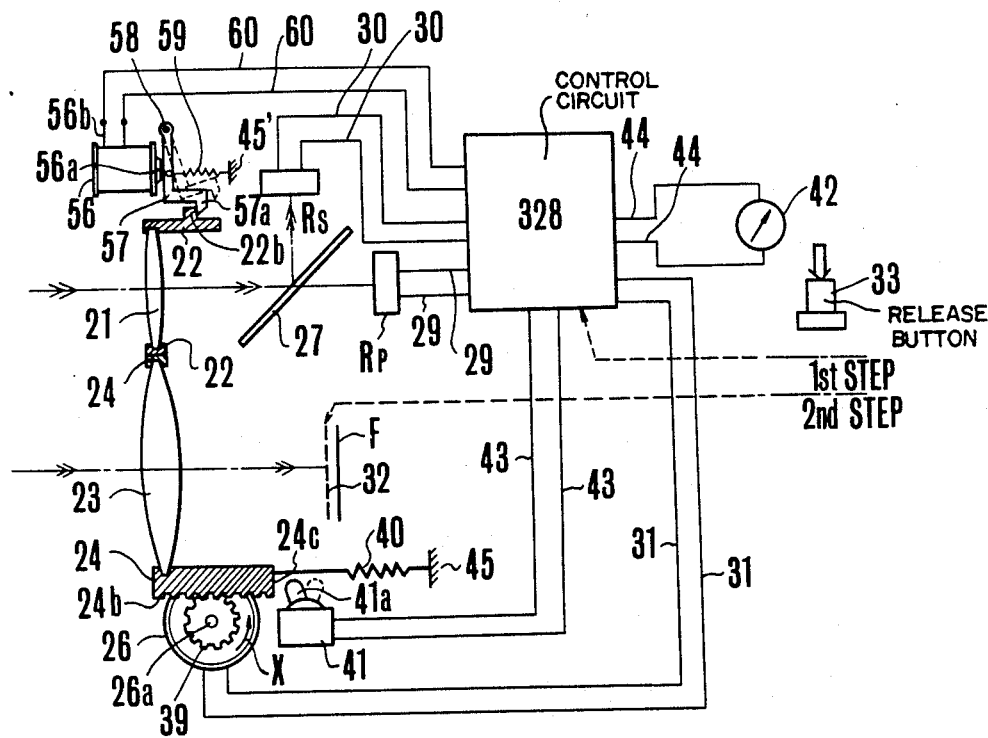
FIG. 13 is a schematic diagram to show arrangement of an important part of a third concrete example when a focussing adjustment system of a camera is composed using the detection method for visibility of an object image according to the present invention.

FIG. 13 is to show the arrangement of important part of a third example in the case when an automatic focus adjusting system of a camera is composed by using the detection circuit of object image visibility of the present invention. In FIG. 13, the arrangement of such component elements as shown by the same codes as those of the component elements of the system shown in FIG. 6, FIG. 9 and FIG. 11 and the function thereof are same as the cases of FIG. 6, FIG. 9, and FIG. 11, therefore the explanations thereof may be omitted without hampering understanding.

The improvement in this system lies in adding a mechanism to set the photographing optical system automatically for example at such position as corresponding to its over focal distance position, in a state wherein detection of object image is impossible which is generated in the case when the brightness of object is very low, or in the case when the object plane consists of almost the same brightness plane and has very low constrast, etc.

First, explanations will be made on the arrangement of a mechanism to set the over focal distance position of the photographing optical system 23. IN FIG. 13, 56 is an electro-magnet made by winding exciting winding 56b around an armature 56a, and the winding 56b is connected to the control circuit 328 through connecting wire 60. 57 is a stop lever which has a checking claw part 57a and is axially supported in rotatable manner around an axial pin 58 being planted on a part of a camera main body not being shown in the drawing by said pin 58, and is biassed in the counter-clockwise direction around the above mentioned pin 58 in the drawing by a spring 59 being spanned between said lever and a part 45° of the camera main body. The checking claw part 57a of the stop lever 57 can engage with the projection part 22b provided at a part of body tube 22 holding the optical system 21 for detecting object visibility, and its function is controlled by the above mentioned electro-magnet 56. That is, when the electro-magnet 56 is not in an excited state, the stop lever 57 is at a state shown by two dot chainline in FIG. 13, but as the electro-magnet 56 is excited, it is pulled by the above mentioned armature 56 and is rotated to clockwise direction around the pin 58 against the biassing force of the spring 59, and its checking claw part 57a proceeds into the shifting path of the projection part 22b of the body tube 22.

In FIG. 13, 39 is a pinion fixedly provided on the rotating axle of the motor 26 and engages with a rack part 24b formed on the body tube 24. 40 is a spring spanned between the end part 24c at one end of the body tube 24 and a part 45 of the camera main body (total form of which is not shown in the drawing) to work to pull the body tube 24 to right hand direction in FIG. 13. 41 is a switch box having a movable arm 41a being positioned within the shifting path of the end part 24c of the body tube 24 and being ordinarily set at the side shown by solid line in FIG. 13 while being set at the side shown by broken line in the drawing only when contacting with the end part 11' of the body tube 11, and having a switch to conduct automatic setting of working condition of the detection circuit of object image visibility and activation of a circuit to generate saw-tooth wave, which are to be described later. Said switch box is connected to the control circuit 328 through the connecting wire 44. 42 is an object distance indication meter connected to the control circuit 328 through connecting wire 44. The body tubes 22, 24 have, in the system of this example, their respective parts directly coupled to each other.

In the system of this example also, being same as in the system shown in FIGS. 9 and 11, consideration is made concerning the generation of noise output caused by the difference in the arrangement of the elements $R_s$, $R_p$, and an output level detection circuit consisting of a resistance $R_T$ and a capacitor $C_T$ is connected to a balance setting circuit, which is so made that the output step of an amplifier made by Darlington connection type two transistors $Tr_1$, $Tr_2$ having high input impedance is emitter-follower connected so that after varying the offset voltage determined by the resistances $Ra$, $Rb$ and the variable resistance $VR_2$ depending on the output appearing there, said output step is supplied to the arithmetic amplifier $AM_3$ through a compensation resistance $R_c$. Further, the contacting piece 41b linked with the movable arm 41a of the switch box 41 in FIG. 13 is connected to said circuits, thereby the above mentioned noise output is eliminated to allow the operating condition of the image visibility detection circuit to be automatically set. $VR_1$ is a variable resistor to set the input +V of the arithmetic amplifier $AM_3$, and the positional relationship of the contacting piece 41b shown by solid line and broken line in FIG. 14 is to correspond to the positional relationship shown by solid line and broken line, respectively, shown in FIG. 13.

In the system of FIG. 13, when a system power source switch not being shown in the drawing is in OFF state, the image visibility detection optical system 21 and the photographing optical system 23 are set at the extreme right position in the drawing by the action of the spring 40, therefore the movable arm 41a of the switch box 41 is set at the side shown by the broken line in the drawing, thus the contacting piece 41b linked therewith is connected to one end of the resistance $R_T$ as shown by broken line in FIG. 14.

While the ordinary shifting zone of the above mentioned both optical systems is so determined that the object image between the near distance to infinity distance is clearly imaged, said both optical systems in this system example are made to be allowed to retract to outside of said ordinary shifting zone, therefore, the visibility of object image on each element in this state is very low and the output of each element becomes such as to correspond to object brightness and not to the visibility of object image. Therefore, the output $V_o$ of the arithmetic amplifier $AM_3$ takes on such value as determined in correspondence to the object brightness and the characteristics of each element. As this output charges capacitor $C_r$, the potential of point $a$, that is, the input of the above mentioned balance setting circuit becomes such as corresponding to the above mentioned noise output. The output of this balance setting circuit is connected to one input terminal of the arithmetic amplifier $AM_3$ while the other terminal thereof is connected to a compensation resistance $R_c$. Also the characteristics of said circuit is such as giving offset voltage (or current) of the arithmetic amplifier $AM_3$ according to the above mentioned noise output for offsetting the effect of noise output. In the detection circuit of object image visibility containing such circuit as mentioned above, its output $V_o$ will apparently no more contain the above mentioned noise output. When the above mentioned optical system is driven by the motor 26 and is shifted within the normal shifting zone, the movable arm 41a of the switch box 41 is changed over to the position shown by solid line in FIG. 9, therefore the contacting piece 41b is set to the side shown by solid line in FIG. 10, thus the potential at the point a is retained by the capacitor $C_T$ so that proper offset voltage (or current) is continuously given to the arithmetic amplifier $AM_3$ and the automatic setting of operating condition of image visibility detection circuit is continued.

Figure 15:
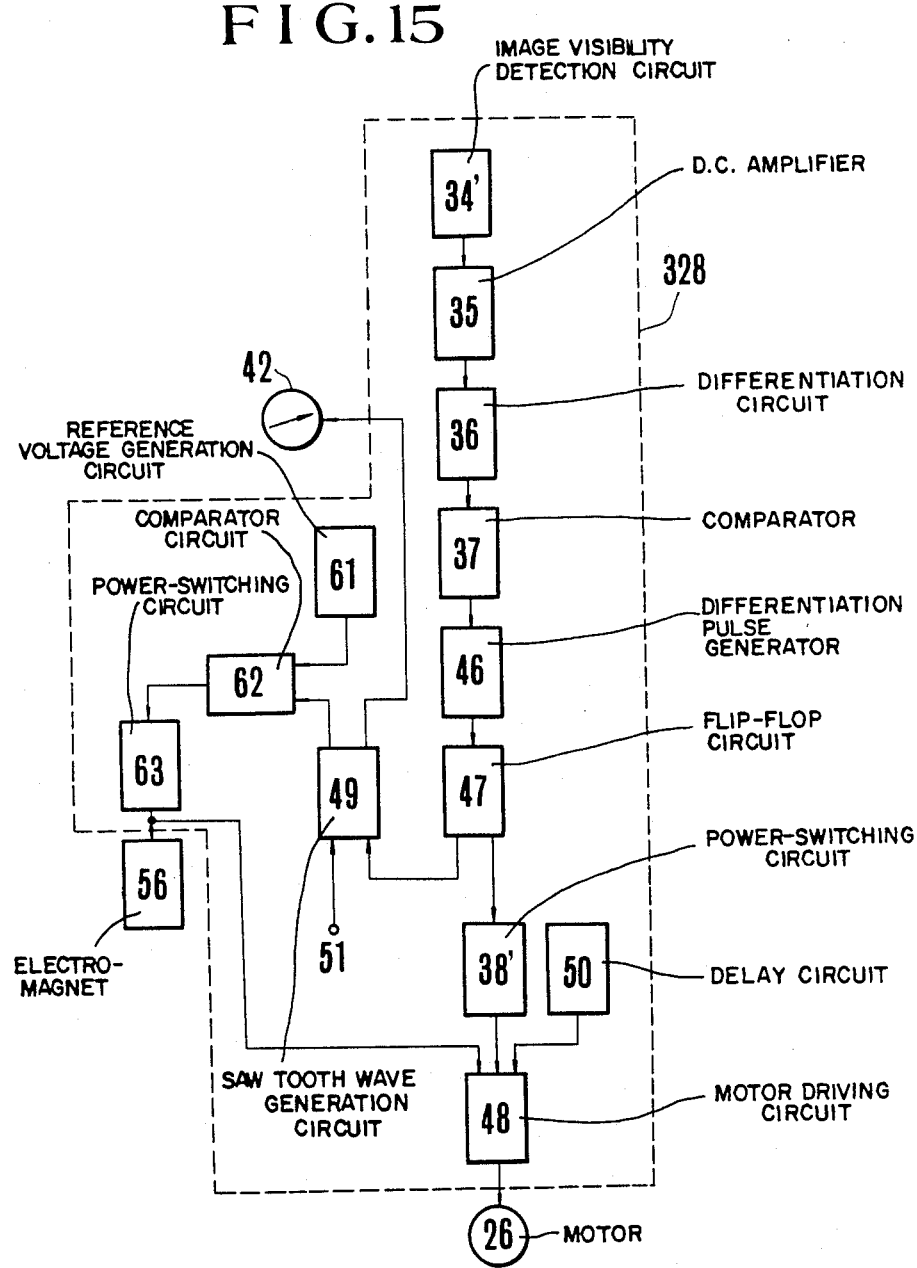
FIG. 15 is a block diagram to show each of the signal treatment circuit parts within the control circuit 328 of the example shown in FIG. 13.

FIG. 15 is a block diagram to show each signal treatment circuit part of the above mentioned control circuit 328, wherein 34' is such image visibility detection circuit as shown in FIG. 14, and 35, 36, 37 are such direct current amplifier, a differentiation circuit and a comparator respectively as same as shown in the control circuit 28 in the system example shown in FIG. 6. 46 is a differentiation pulse generator, 47 is a flip-flop circuit, 38' is a power-switching circuit, 48 is a motor driving circuit, and 49 is a saw tooth wave generation circuit, wherein the above mentioned motor 26 is connected to the output terminal of the motor driving circuit 48 while a distance indication meter 42 is connected to the output terminal of the output of a saw tooth wave generation circuit 49. 50 is a delaying circuit and 51 is a terminal to input the initiation signal from the above mentioned switch box 41 into the saw tooth wave generation circuit 49.

61 is a reference voltage generation circuit which always provides a prescribed voltage $V_s$ shown in the output drawing of the saw tooth wave generation circuit 49 of FIG. 18(g) (this voltage $V_s$ is so determined as corresponding for example, to the maximum pushed out position of the optical systems 21, 23). 62 is such comparator circuit as, for example, a Schmitt-trigger circuit, and provides such specific signal as shown in FIG. 18(h) at the time when the output voltage of the saw tooth wave generation circuit 49 exceeds the output voltage $V_s$ of a reference voltage generation circuit 61. 63 is a power-switching circuit to ON and OFF the electro-magnet 56 based on the output from the comparator circuit 62.

Figure 18:
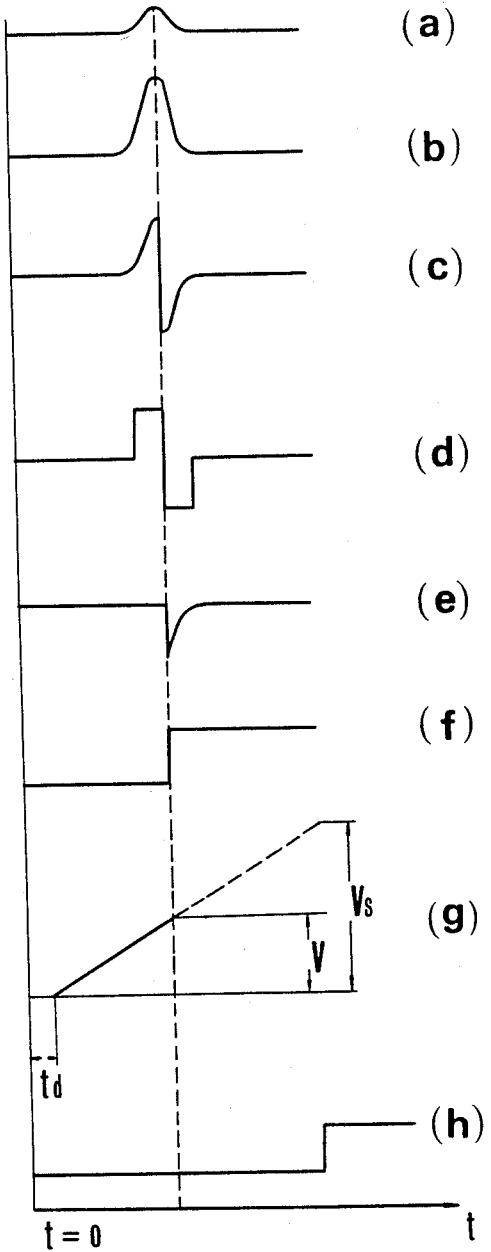
FIG. 18 is to show chronological change in each output when the automatic focus adjusting system of each of the circuit parts 34', 34'', 35, 36, 37, 46, 47, 49, 61 of the control circuits 328, 428 shown in FIG. 15

The chronological variation of each output of the circuit parts, 34', 35, 36, 37, 46, 47, 49 and 61 in the above mentioned control circuit 328 at the time of operation of the system with the above mentioned arrangement is shown respectively as $(a)$, $(b)$, $(c)$, $(d)$, $(e)$, $(f)$, $(g)$ and $(h)$ in FIG. 18. And the abscissa in FIG. 18 shows the elapse of time based on the initiation time of the release button 33 being set as $t = 0$.

Next the function of this system will be explained.

When a photographer points the system to an object to be photographed and a release button 33 of 2 step action type is pressed down to a first step, all circuit parts except the saw tooth wave generation circuit 49 and the motor driving circuit 48 in the control circuit 328 will enter the operating state by closing of a switch not shown in the drawing. Also, at this time, the flip-flop circuit 47 is set at OFF state.

At this time, as shown in FIG. 14, the balance setting circuit connected to the arithmetic amplifier $AM_3$ functions to give proper off-set voltage (or current) to the arithmetic amplifier $AM_3$ so as to eliminate the noise output depending on the brightness of the object of the photo-electric conversion elements, $R_s$, $R_p$ as described above in detail. Next, after an elapse of a prescribed period of time $t_d$ being set at the delaying circuit 50, the motor driving circuit 48 is placed in ON state by the output from said delaying circuit 50, therefore the motor 26 starts rotation to the direction shown by an arrow mark X in FIG. 13, and the simultaneous advancement of the optical systems 21, 23 (shifting to left hand direction in FIG. 13) is started through the pinion 39 fixedly provided on the axle 26a of said motor 26 and the rack part 24b of the body tube 24 engaged with said pinion 39. As the movable arm 41a of the switch box 41 is changed over as shown by solid line in FIG. 13 along with the advancing of the optical systems 21, 23, the contacting piece 41b in FIG. 14 becomes OFF (the state shown by solid line in FIG. 14), while the potential at the point a in the circuit of FIG. 14 is retained by the capacitor $C_T$, thus the automatic setting of the operating condition of image visibility detection circuit is continued. Also, at this time, saw tooth wave initiation signal is generated from a signal generation means which is not shown in the drawing but is of such type as conventionally known by the change over action of a switching means which is not shown in the drawing but is so provided as linked with the movable arm 41a of said box 41 in the switch box 41 in a same manner as that of the above mentioned contacting piece 41b. Said signal is sent to the saw tooth wave generation circuit 49 through a terminal 51 in FIG. 15, and said circuit 49 starts operation thereby to generate repeatedly a linear signal with a certain increase rate containing the delay $t_d$ by the delay circuit 50 as shown in FIG. 18 (g). The delay time of the delay circuit 50 needs to be so set as being longer than such period of time than that required for the electric change corresponding to noise output to be accumulated at the capacitor $C_T$ as the circuit part for setting the operating condition of the above mentioned arithmetic amplifier $Am_3$ is activated.

As the visibility of an object on the elements $R_s$, $R_p$ varies along with the advancing shifting of the optical systems 21, 23, the output of the image visibility detection circuit 34' varies as shown in FIG. 18(a). The crest of the rise in said output wave-form is to correspond to the maximum visibility point of object image. The output of said detection circuit 34' is amplified by the direct current amplifier 35 to a signal of such size as will make the subsequent process easy as shown in FIG. 18(b), then is sent to the differentiation circuit 36, where the code is reversed in front or in the rear of the maximum visibility point of object image and is converted to such signal as passing the zero potential within very short period of time at the maximum visibility point. The output of this differentiation circuit 36 is then supplied to the comparator 37 and the sudden change point of differentiation output (FIG. 18(c)), that is, the point to afford the maximum visibility point of object image is detected and is supplied to a next differentiation pulse generator 46 and a differentiation pulse is generated at the maximum visibility point of the object image. The outputs of the comparator 37 and the differentiation pulse generator 46 are shown by FIG. 18(d), (e), respectively. The differentiation pulse (FIG. 18(e)) is then supplied to a flip-flop circuit 47 to shift said circuit 47 to an ON state. The output of the flip-flop circuit 47 is such as shown in FIG. 18(f) and is given to both of the saw tooth wave generation circuit 49 and the power switching circuit 38'. By the output of the flip-flop circuit 47, the increase of the output, being increased with a certain speed is stopped at the saw tooth wave generation circuit 49 as shown in FIG. 18(g) and the output V at the time the increase is stopped is to be retained. This output V in the state, wherein the increase of the saw tooth wave generation circuit 49 is stopped, is sent to the indication meter 42, where it is indicated as an object distance.

On the other hand, as the power-switching circuit 38' either shifts the motor driving circuit 48 to non-operative state instantaneously by the output of the flip-flop 47 or short circuits both ends of the motor 26 to stop the rotation thereof within a short period of time.

Here, the visibility detection optical system 21 and the photographing optical system 23 are set at such position that an object image will be most visibly imaged on film plane, thus automatic focus adjustment is achieved.

Next, as the shutter opening and closing member 32 is opened and closed in a manner as known conventionally by pressing down the release button 33 to second step to give proper exposure of film F, photographing is completed. As the pressing of the release button 33 is released, the entire operations of the system are released by opening of a switch, not shown in the drawing, and at this time the above mentioned optical system 21, 23 retreat to their initial positions (the final position at right side in FIG. 13), and along with said retreat, the movable arm 41a of the switch box 41 is changed over to the state shown by broken line in FIG. 13, therefore the contacting piece 41b in FIG. 14 is again connected to one end of the resistance $R_T$.

Next, explanations will be made of the function in the case when the maximum visibility point of object image can not be properly detected.

When the maximum visibility of image can not be detected as the optical systems 21, 23 are shifted, the differentiation pulse generator 46 will not generate such clear pulse as shown in FIG. 18(e), and the flip-flop circuit 47 is retained in OFF state, therefore the motor 14 continues rotation and saw tooth wave generation is continued. Therefore, the output of the saw tooth wave generation circuit 49 continues increasing as shown by broken line in FIG. 18(g) and reaches, for example, the predetermined voltage $V_s$ being set in the reference voltage generation circuit 61 and so determined as corresponding to the maximum shifting position of the optical system.

At this time the comparator circuit 62 outputs such signal as shown in FIG. 18(b) at the power switching circuit 63 as mentioned above. By this, the power-switching circuit 63 excites the electro-magnet 56 and at the same time stops the operation of the motor driving circuit 48. Therefore, since the stop lever 57 in FIG. 13 is set at the position shown by a solid line in the drawing, also the optical systems 21, 23 are caused to retreat by the force of a spring 40, the projection part 22b formed on the body tube 22 engages with the checking claw part 57a of the stopper 57, and the optical system is temporarily retained at said position. As said retaining position has been determined in correspondence to an over focal distance of the photographing optical system 23 as mentioned above, almost distinctive photographing of an object image can be made by pressing down the release button 33 to second step. When the pressing of the release button 33 is released, entire operations of the system are released, thus the system returns to its initial position (the final end position at right side in FIG. 13) by the action of the spring 40.

Next, explanations will be made on fourth concrete example of the case when an automatic focus adjusting system of a camera is composed using the detection method of object image visibility of the present invention.

Figure 16:
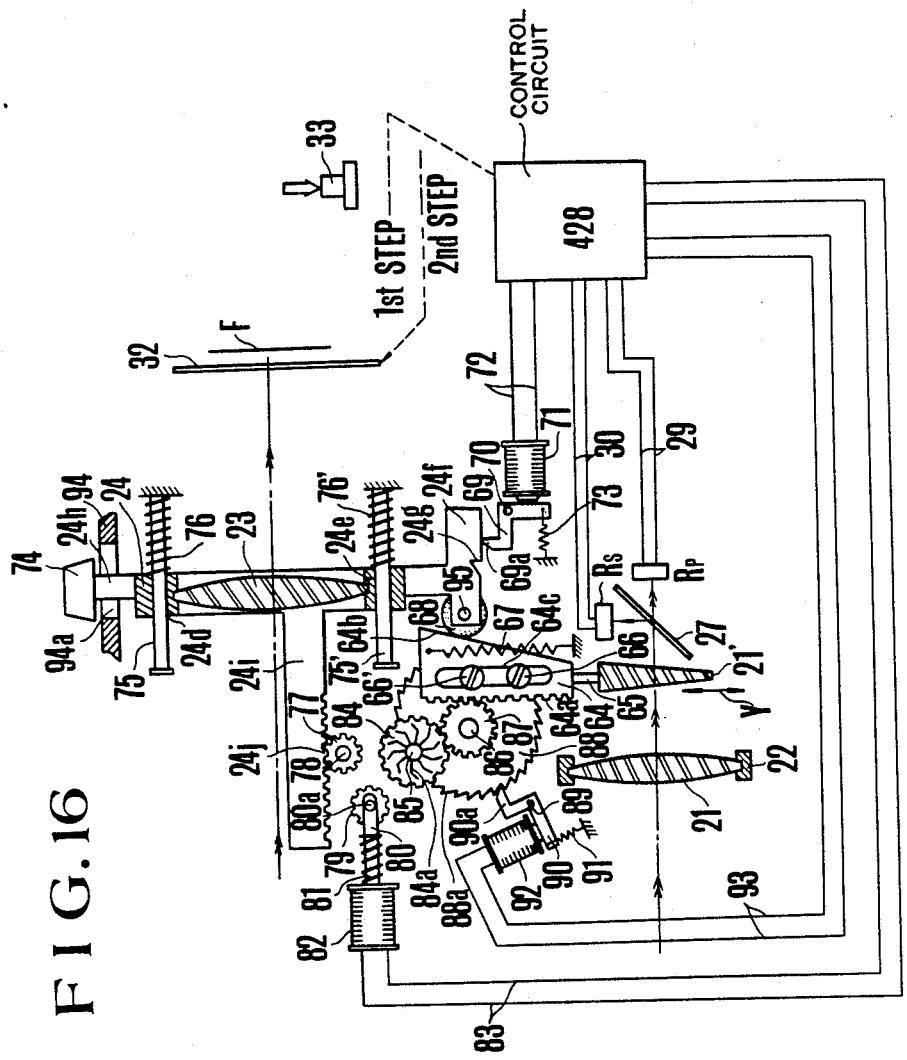
FIG. 16 is a schematic diagram to show arrangement of an important part of fourth concrete example when an automatic focus detection system of a camera is composed using the detection method for visibility of object image of the present invention.
Figure 17:
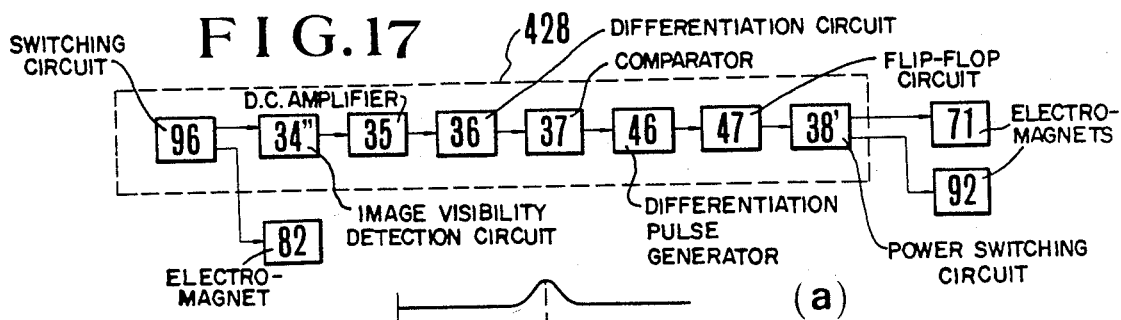
FIG. 17 is a block diagram to show in a concrete manner the control circuit 428 shown in FIG. 16.

FIG. 16 is to show the arrangement of an important part of this system and FIG. 17 is to show arrangement of the control circuit 428 in this system. As the image visibility detection circuit employed in the system of this example, any one of those shown in FIG. 5A to FIG. 5G may be used, and the circuit shown in FIG. 5F is used. Since the arrangement of those component parts of the system shown in FIG. 16 and of each circuit part in the control circuit 428 shown in FIG. 17 as being identified by same codes as those in the four system examples explained previously and their function are same as those in said four examples, the explanations thereof will be omitted as much as possible to avoid duplication. In the arrangement of the system of this example, the image visibility detection optical system 21 is fixed while the photographing optical system 23 only is so made as can move to the direction of the optical axis for focus adjustment.

In FIG. 16, 21 is an optical wedge, which is supported at a sliding member 64 through a connecting rod 65. A guide slot 64c is perforated in a sliding member 64 and guide pins 66, 66' planted in the camera main body not being shown in the drawing engage with said slot, thus the sliding member 64 can slide in up and down direction in FIG. 16, and the optical wedge 21' makes entering or retreating to or from the optical path of the optical system 21 as shown by arrow mark Y in the drawing along with the sliding of said sliding member 64 to vary the visibility of object image on the elements $R_z$, $R_p$.

The sliding member 64 is biassed in the downward direction in the drawing by a spring 67 fixed to the camera main body at its one end, and a rack 64a is formed at one side of said member 64 to engage with small gear 87 provided rotatably around the axle 86 fixed to the camera main body, while a cam plane 64b is formed at the other side.

Guide holes 24d, 24e are formed at the body tube 24 to hold the photographing optical system 23, and guide rods 75, 75' fixedly provided on the camera main body go through the same to enable the photographing optical system 23 to proceed and retreat along its optical axis. 76, 76' are springs provided between the body tube 24 and the camera main body to function to bias the body tube 24 to left direction in the drawing. 68 is a cam-follower axially supported rotatably by a pin 95 planted on a first projection arm 24f of the body tube 24 and can contact with the cam plane 64b of the sliding member 64. Therefore, the pull out amount of the photographing optical system 23 is determined by the position in up and down direction in the drawing of the sliding member 64. 69 is a first checking lever which is axially supported rotatably by a pin 70 planted on the camera main body and is biassed to clockwise direction around the pin 70 by the spring 73, having a checking claw part 69a to engage with a notch 24g formed at a part of the first projection arm 24f of the body tube 24, and having such function to check and retain the optical system 23 at pull out starting position. 71 is a first electro-magnet for releasing checking action of the first checking lever 69 to the body tube 24 and is connected to the control circuit 428 through connecting wire 72.

88 is a ratchet wheel being integral with the above mentioned small gear 87 and having a claw part 88a, and a checking claw part 90a of a second checking lever 90, being axially supported rotatably by a pin 89 planted in the camera main body biased to counter-clockwise direction in the drawing around said pin 89 by a spring 91, can engage with said claw part 88a. 92 is a second electro-magnet to control the engagement of the checking claw part 90a of the second check lever 90 and the claw part 88a of the ratchet wheel 88 and is connected to the control circuit 428 through the connecting wire 93. 84 is an impeller axially supported rotatably by an axle 85 fixedly provided on the camera main body and engaging with the above mentioned small gear 87, and having a van 84a for adjusting speed. 77 is a pinion which is axially supported rotatably by a fixed axle 78 of the camera main body and engages with a rack 24j formed on a part of the second projection arm 24i of the body tube 24. 79 is a small gear which is rotatably supported on a fixed pin 80a of an actuator 80 for a third electro-magnet 82 being connected to the control circuit 428 through connecting wire 83. 81 is a spring to function to bias the actuator 80 to right direction in the drawing. Therefore, when the third electro-magnet 82 is in a non-excited state, the actuator 80 proceeds to the rightward direction in the drawing by the biassing action of the spring 81 to engage with both of the pinion 77 and the ratchet wheel 84 to enable the linking between said both parts to be made.

74 is an operating knob provided at an extended part 24h of the body tube 24 extending to outside through a hole 94a of a cover 94 of a camera, and enables manually the photographing optical system 23 to be returned to its first full out initiation position.

In the control circuit 428 of FIG. 17, 96 is a switching circuit and 34" is an image visibility detection circuit based on the circuit arrangement shown in FIG. 5F as mentioned above. The chronological change of the output of each of the circuit parts 34", 35, 36, 37, 46 and 47 in the control circuit 428 at the time when the system is in operation is shown in FIG. 18 (a), (b), (c), (d), (e) and (f), respectively, being same as in previous system examples.

In the operation starting state of the system, the first, second and third electro-magnets 71, 92 and 82 are all in non-excited state, therefore the first checking lever 69 is in such state that its checking claw part 69a engages with the notch 24g of the body tube 24 to check and retain the photographing optical system 23 at its pull out starting position, also the second checking lever 90 is in a state wherein its checking claw part 90a and the claw part 88a of the ratchet wheel 88 are not engaged, further, the small gear is in such state as engaging with both of the pinion 77 and the ratchet wheel 84. Also the optical wedge 21' is in a state being retained at the upper most position in the drawing.

The function of the system in this example having the above set-up is now explained. When a photographer points the system to an object to be photographed and presses down the release button of 2 step action type to its first step, first the switching circuit 96 starts operation in the control circuit 428, and said switching circuit actuates the image visibility detection circuit 34" and at the same time excites the third electro-magnet 82. By this, the linking between the pinion 77 and the ratchet wheel 84 is released, thus the optical wedge 21' starts shifting to downward direction by the functional force of the spring 67. At this time, the van 84a of the ratchet wheel 84 exercises its speed adjusting function. Along with the shifting of the optical wedge 21, the object image visibility on the series type and parallel type elements, $R_s$, $R_p$ varies from time to time, and as it comes to the maximum visibility state, the flip-flop circuit 47 in the control circuit 428 is shifted from OFF state to ON state as shown in FIG. 18(f), therefore the first and second electro-magnets 71, 92 are excited. When the second electro-magnet 92 is excited, the second checking lever 90 is rotated to clockwise direction around pin 89 against the spring 91 and its checking claw part 90a engages with the claw part 88a of the ratchet wheel 88, therefore, the rotation of said ratchet wheel 88 is stopped, thus the shifting of the sliding member 64 and of optical wedge 21' to downward direction is stopped.

On the other hand, as the first electro-magnet 71 is excited, the first checking lever 69 is rotated to counter-clockwise direction around the pin 70, and the engagement between its checking claw part 69a and the notch 24g of the body tube 24 is released, therefore the photographing optical system 23 is pulled out to left direction in FIG. 16 by the action of the spring 76, 76' until the cam-follower 68 provided on its body tube 24 comes in contact with the cam plane 64b of the sliding member 64. At this time, the cam plane 64b of the sliding member 64 is so designed that the photographing optical system 23 forms the most distinctive object image on the film F according to the stopping position of the optical wedge 21'. Thus, the focus adjusting action of the photographing optical system 23 is completed by said step.

As the release button 33 is pushed down to the second step in this state, the shutter opening and closing member 32 is activated as conventionally known to conduct photographing.

When the pressing of the release button 33 is released as the first, second and third electro-magnets 71, 92, 82 are all de-excited, the first and second checking levers 69, 90 are released, and the small gear 79 becomes to engage with both of the pinion 77 and the ratchet 84.

When the operating knob 74 is manually shifted in the rightward direction in FIG. 15 after releasing of the release button 33, the photographing optical system 23 is returned to its prescribed pull-out starting position, and at the same time the sliding member 64 is pulled upward in the drawing by coupling of the rack 24j, the pinion 77, the small gear 79, the ratchet wheel 84, the small gear 86 and the rack 64a, and the system will be set at its operation starting state at the point where the body tube is checked by the first check lever 69.

What is claimed is:

1. A system for detecting the sharpness of an object image, comprising:
   an image forming optical system forming an image of an object;
   first photoelectric transducing means which receives the object image formed by said optical system and presents an electrical output which corresponds to the sharpness of the image, said first transducing means placed at a position capable of receiving the object image formed by said optical image and having:
   a first photosensitive element of a slender strip shape, and
   a first pair of electrodes connected to short sides of said element;
   second photoelectric transducing means which receives the object image formed by said optical system and presents an electrical output which corresponds to the sharpness of the image, said second transducing means being placed at a position capable of receiving the object image formed by said optical system and having:
   a second photosensitive element of a slender strip shape, and
   a second pair of electrodes connected to long sides of said second element;
   electrical circuit means to electrically process the output of said first and second transducing means and output image sharpness information based on the output of said first and second transducing means; and
   correcting means to eliminate from said circuit means noise outputs of said first and second transducing means having no relationship with image sharpness, said correcting means being electrically coupled to said circuit means to supply an electrical signal thereto based on the brightness of the object, thereby the noise output of said first and second transducing means having no relationship with image sharpness is eliminated and detection of image sharpness may be performed while eliminating noise signals having no relationship with image sharpness.

2. A system according to claim 1, in which said electrical circuit means is adapted to have its operating state set to eliminate the noise output of said first and second photoelectric transducing means having no relationship with image sharpness, wherein said correcting means includes an adjusting circuit means to set the operating state of said electrical circuit means, wherein said adjusting circuit means is electrically coupled to said electrical circuit means and provides said electrical signal corresponding to the brightness of the object to said electrical circuit means for setting the operating state of the electrical means, thereby the operating state of said electrical circuit means is set to eliminate the noise outputs of the first and second transducing means having no relationship with image sharpness.

3. A system according to claim 2, in which said image forming optical system has an optical axis and is movable along said axis to place said object image at a predetermined position, while said first and second photoelectric transducing means are both virtually placed at said predetermined position to receive the object image formed by said optical system.

4. A system according to claim 3, in which both of said first and second photoelectric transducing means are electrically coupled to said electrical circuit means, said correcting means further including brightness detecting means to detect the brightness of the object for presenting an electrical output corresponding to said brightness, and said adjusting circuit means being electrically coupled to said detecting means and setting the operating state of said electrical circuit means by supplying said electrical signal to said electrical circuit means on the basis of the output of the detecting means.

5. A system according to claim 4, in which said brightness detecting means is placed at a position capable of receiving a light beam coming from the object through said image forming optical system, for detecting the brightness of the object.

6. A system according to claim 5, in which said brightness detecting means includes optical means to diffuse the light beam coming from the object through said image forming optical system and third photoelectric transducing means which receives the light beam coming from the object through said optical means and presents an electrical output which corresponds to the brightness of the object, said adjusting means being electrically coupled to said transducing means.

7. A system according to claim 3, in which said correcting means further includes a memory means which can be selectively coupled to at least one of said first and second photoelectric transducing means and memorizes the output of said transducing means when coupled to said transducing means, said adjusting circuit means being electrically coupled to said memory means for supplying the electrical signal corresponding to the brightness of the object to said electrical circuit means on the basis of the information memorized by said memory means.

8. A system according to claim 7, in which said electrical circuit means can be selectively coupled to both of said first and second photoelectric transducing means, and wherein the system further comprises:
a switching means for selectively changing over the connection of the transducing means between the memory means and the electrical circuit means, said memory means memorizing the output of said transducing means when coupled to at least one out of said first and second transducing means by said switching means, and said electrical circuit means processing the output of said both transducing means when coupled thereto by said switching means.

9. A system according to claim 8, in which said image forming optical system can be set at a hyper-focal distance position on said optical axis, and said first and second transducing means presenting an electrical output which corresponds to the brightness of the object when said optical system is set at said hyper-focal distance position, wherein said switching means can detect the position of said optical system on said axis to couple at least one of said first and second transducing means to said memory means when said optical system is set at said hyper-focal distance position and to couple said both transducing means to said electrical circuit means when said optical system is out of the hyper-focal distance position.

10. A system according to claim 3, in which said electrical circuit means includes:
a first input terminal for inputting the outputs of said first and second transducing means, said first terminal being connected to said both transducing means;
a second input for inputting said electrical signal being provided by said adjusting circuit means, said second terminal being connected to said adjusting circuit means; and
an output terminal for providing said image sharpness information.

11. A system according to claim 10, in which said correcting means further comprises memory means which can be selectively coupled to said output terminal of the electrical circuit means and memorizes the output of said electrical circuit means when coupled to said output terminal, wherein said adjusting circuit means is coupled to said memory means and provides said electrical signal which corresponds to the brightness of the object to said electrical circuit means on the basis of the information memorized in said memory means.

12. A system according to claim 11, further including switching means to selectively couple said memory means to said output terminal of the electrical circuit means.

13. A system according to claim 12, in which said optical system can be set at a hyper-focal distance position on said optical axis, wherein said switching means can detect the position of said optical system on said axis to couple said memory means to said output terminal of the electrical circuit means only when said optical system is set at an hyper-focal distance position.

14. A device for detecting the sharpness of an object image formed by an image forming optical system, wherein said optical system has an optical axis and is movable along said axis to place the image of said object at a predetermined position comprising:
first photoelectric transducing means to receive the object image formed by said optical system and present an electrical output corresponding to the sharpness of the image, said first transducing means being virtually placed at said predetermined position and having:
a first photosensitive element of a slender strip shape, and
a first pair of electrodes being connected to short sides of said first element;
second photoelectric transducing means to receive the object image formed by said optical system and present an electrical output corresponding to the sharpness of the image, said second transducing means being virtually placed at said predetermined position and having:
a second photosensitive element of a slender strip shape, and
a second pair of electrodes being connected to long sides of said second element;
third photoelectric transducing means to detect the brightness of the object and present an electrical output corresponding to said brightness; and
processing circuit means for electrically processing the output of said first and second transducing means and providing image sharpness information, said circuit means being coupled to said first, second and third transducing means and processing the outputs of said first and second transducing means while eliminating noise outputs of said first and second transducing means having no relationship with image sharpness on the basis of the output of said third transducing means;
whereby, noise signals having no relationship with the image sharpness is eliminated and detection of the image sharpness is performed.

15. A device according to claim 14, in which said processing circuit means has an operational amplifier circuit to electrically combine the outputs of said first and second photoelectric transducing means, wherein said amplifier circuit is coupled to said first, second and third transducing means and presents image sharpness information by combining the outputs of said first and second transducing means while eliminating the noise output of said first and second transducing means having no relationship with image sharpness basis of on the output of said third transducing means.

16. A device according to claim 15, in which said operational amplifier circuit can have its operating state set to eliminate the noise output of said first and second transducing means having no relationship with image sharpness, wherein said processing circuit means further includes an adjusting circuit to set the operating state of said amplifier circuit, said adjusting circuit being coupled to said amplifier circuit and said third transducing means for setting the operating state of the amplifier circuit so as to eliminate the noise output of said first and second transducing means having no relationship with image sharpness on the basis of the output of said third transducing means.

17. A device according to claim 16, in which said operational amplifier circuit includes:
 a first input terminal for inputting the output of said first and second transducing means, said first input terminal being connected to said first and second transducing means;
 a second input terminal for inputting a setting signal from said adjusting circuit, said second input terminal being connected to said adjusting circuit; and
 an output terminal to provide said image sharpness information.

18. A device according to claim 17, in which one out of said first and second transducing means is coupled to said first input terminal of said amplifier circuit, while the other is coupled between said first input terminal and said output terminal of said amplifier circuit.

19. A device according to claim 18, further comprises optical means to diffuse a light beam coming from the object, said optical means being positioned to be opposed to said third transducing means for diffusing the light beam being incident into said third transducing means, wherein said third transducing means presents said electrical output corresponding to the brightness of the object by receiving the light beam coming from the object through said optical means.

20. A device according to claim 19, in which said optical means and said third transducing means is placed at a position capable of receiving the light beam coming from the object through said optical system.

21. A device for detecting the sharpness of an object image formed by an image forming optical system, wherein said optical system has an optical axis and is movable along said axis to place the image of the object at a predetermined position, comprising:
 first photoelectric transducing means to receive the object image formed by said optical system and present an electrical output corresponding to the sharpness of the image, wherein said transducing means is virtually placed at said predetermined position and has:
  a first photosensitive element of a slender strip shape, and
  a first pair of electrodes being connected to short sides of said first element;
 second photoelectric transducing means to receive the object image formed by said optical system and present an electrical output corresponding to the sharpness of the image, wherein said transducing means is virtually placed at said predetermined position and has:
  a second photosensitive element of a slender strip shape, and
  a second pair of electrodes being connected to long sides of said second element;
 processing circuit means to electrically process the output of said first and second transducing means and output image sharpness information based on the output of said both transducing means;
 memory means for memorizing the output of at least one of said first and second transducing means, said memory means being coupled to said processing circuit means; and
 switching means for selectively changing over said first and second transducing means between said memory means and said processing circuit means, wherein said memory means memorizes the output of at least one of said first and second transducing means when coupled to at least one of the transducing means by said switching means, and said processing circuit means processes the outputs of said first and second transducing means while eliminating noise output of said both tranducing means having no relationship with image sharpness on the basis of the information memorized in said memory means when coupled to said both transducing means by said switching means, thereby detection of the image sharpness is performed while eliminating noise signals having no relationship with image sharpness.

22. A device according to claim 21, in which said optical system can be set at a hyper-focal distance position on said optical axis and said first and second transducing means providing an electrical output corresponding to the brightness of the object when said optical system is set at said hyper-focal distance position, wherein said switching means can detect the position of said optical system on said axis for coupling at least one of said first and second transducing means to said memory means when said optical means is set at said hyper-focal distance position and coupling said both transducing means to said processing circuit means when said optical system is out of said hyper-focal distance position.

23. A device according to claim 22, in which said processing circuit means includes an operational amplifier circuit to electrically combine the outputs of said first and second transducing means, wherein said amplifier circuit is coupled to said memory means and provides image sharpness information by combining the outputs of said first and second transducing means, while eliminating the noise output of said both transducing means having no relationship with image sharpness on the basic of the information memorized in said memory means when connected to said both transducing means by said switching means.

24. A device according to claim 23, in which said operational amplifier circuit can have its operating state set to eliminate the noise output of said first and second transducing means having no relationship with image sharpness, wherein said processing circuit means further comprises an adjusting circuit to set the operating state of said amplifier circuit, said adjusting circuit is coupled to said memory means and said amplifier circuit, and sets the operating state of said amplifier circuit to eliminate the noise output of said first and second transducing means having no relationship with image sharpness on the basic of the information memorized in said memory means.

25. A device according to claim 24, in which said amplifier circuit has:

a first input terminal for inputting the outputs of said first and second transducing means, said first input terminal being selectively connectable to said both transducing means by said switching means;

a second input terminal for inputting a setting signal from said adjusting circuit, said second input terminal being connected to said adjusting circuit; and an output terminal to provide said image sharpness information.

26. A device according to claim 25, in which one of said first and second transducing means is selectively coupled to said first input terminal of said amplifier circuit by said switching means, while the other one is selectively coupled between said first input terminal and said output terminal of the amplifier circuit.

27. A device for detecting the sharpness of an object image formed by an image forming optical system, wherein said optical system has an optical axis and is movable along said axis to place the image of an object at a predetermined position, comprising:

first photoelectric transducing means for receiving the object image formed by said optical system and presenting an electrical output corresponding to the sharpness of the image, wherein said first transducing means is virtually placed at said predetermined position and has;

a first photosensitive element of a slender strip shape, and a first pair of electrodes being connected to short sides of said first element;

second photoelectric transducing means for receiving the object image formed by said optical system and presenting an electrical output corresponding to the sharpness of the image, wherein said second transducing means is virtually placed at said predetermined position and has:

a second photosensitive element of a slender strip shape, and a second pair of electrodes being connected to long sides of said second element;

processing circuit means to electrically process the output of said first and second transducing means for providing image sharpness information, wherein said circuit means has an input circuit and an output circuit and said input circuit is coupled to said both transducing means, memory means to memorize the output of said processing circuit means, said memory means being coupled to said input circuit of the processing circuit means, and switching means for selectively coupling said memory means to said output circuit of the processing circuit means, wherein said memory means memorizes the output of said processing circuit means when coupled to said output circuit of the processing circuit means by said switching means, and said processing circuit means provides said image sharpness information from said output circuit by processing the output of said both transducing means while eliminating noise outputs of said both transducing means having no relationship with image sharpness on the basis of the information memorized in said memory means, whereby detection of the image sharpness is performed while eliminating the noise signal having no relationship with image sharpness.

28. A device according to claim 27, in which said optical system can be set at a hyper-focal distance position on said optical axis, and when said optical system is set at said hyper-focal distance position each of said first and second transducing means present an electrical output which corresponds to the brightness of the object, and said processing circuit means provides object brightness information from said output circuit on the basis of the outputs of said both transducing means, wherein said switching means can detect the position of said optical system on said axis for coupling said memory means to said output circuit of the processing circuit when said optical system is set at said hyper-focal distance position.

29. A device according to claim 28, in which said processing circuit means has an operational amplifier circuit to electrically combine the outputs of said first and second transducing means, wherein said amplifier circuit is coupled to said input and output circuits and outputs image sharpness information through said output circuit by combining the outputs of said both transducing means while eliminating the noise outputs of said both transducing means having no relationship with image sharpness on the basis of the information memorized in said memory means.

30. A device according to claim 29, in which said operational amplifier circuit can have its operating state set to eliminate the noise output of said first and second transducing means having no relationship with image sharpness, wherein said processing circuit means further has an adjusting circuit to set the operating state of said amplifier circuit, said adjusting circuit being coupled to said memory means and said amplifier circuit and setting the operating state of said amplifier circuit so as to eliminate the noise outputs of said first and second tranducing means having no relationship with image sharpness on the basis of the information memorized in said memory means.

31. A device according to claim 30, in which said amplifier circuit further has:

a first input terminal for inputting the output of said first and second transducing means, said first input terminal being connected to said both transducing means;

a second input terminal for inputting a setting signal from said adjusting circuit, said second input terminal being connected to said adjusting circuit; and an output terminal, wherein said memory means is selectively connected to said output terminal by said switching means.

32. A device according to claim 31, in which one of said first and second transducing means is coupled to said first input terminal of said amplifier circuit, while the other is coupled between said first input terminal and said output terminal of the amplifier circuit.

* * * * *